United States Patent
Yates

(10) Patent No.: US 6,290,794 B1
(45) Date of Patent: Sep. 18, 2001

(54) METHOD OF MANUFACTURING CUSHIONED BICYCLE SADDLE

(76) Inventor: Paul M. Yates, 5814 Briar Tree Dr., LaCanada, CA (US) 91011

( * ) Notice: Subject to any disclaimer, the term of this patent is extended or adjusted under 35 U.S.C. 154(b) by 0 days.

This patent is subject to a terminal disclaimer.

(21) Appl. No.: 09/347,780

(22) Filed: Jul. 6, 1999

Related U.S. Application Data

(62) Division of application No. 09/209,858, filed on Dec. 11, 1998, now Pat. No. 6,030,035, which is a division of application No. 08/955,897, filed on Oct. 22, 1997, now Pat. No. 5,904,396.

(51) Int. Cl.[7] .......................... B29C 39/12; B29C 69/02; B62J 1/18
(52) U.S. Cl. ................... 156/145; 156/290; 156/308.4; 264/257; 264/263; 264/266; 264/267
(58) Field of Search ...................... 156/221, 145, 156/290, 308.4; 264/155, 257, 263, 266, 267

(56) References Cited

U.S. PATENT DOCUMENTS

| 4,955,909 | * | 9/1990 | Ersek et al. | 623/11 |
| 5,108,076 | * | 4/1992 | Chiarella | 297/195 |
| 6,017,407 | * | 1/2000 | Yates | 156/221 |

* cited by examiner

Primary Examiner—Jan H. Silbaugh
Assistant Examiner—Stefan Staicovici
(74) Attorney, Agent, or Firm—Walter A. Hackler

(57) ABSTRACT

A cushioned bicycle saddle and a method for manufacturing same are provided. The saddle includes a multiple density, cushioned surface bonded to a saddle shell which may include multiple openings. The saddle includes layer of soft, resilient gel bonded to a fabric surface. A flexible, orthotic shoe, disposed between the shell and the resilient gel, is provided in cooperation with the shell openings. The saddle may include an opening in a horn portion of the shell and the shoe may be highly resilient along the horn opening in order to prevent excessive pressure on a cyclist seated on the saddle. A method includes the steps of disposing the saddle shell having a fabric sealed thereto, into a mold having a molding surface defining a desired contour and/or pattern of embossment to be formed in the fabric. A thermoplastic gelable medium is injected between the shell and the fabric. The fabric is contoured and/or embossed by allowing the gelable medium to cool while the shell is disposed in mold.

9 Claims, 3 Drawing Sheets

METHOD OF MANUFACTURING CUSHIONED BICYCLE SADDLE

This application is a divisional application of U.S. Ser. No. 09/209,858 filed Dec. 11, 1998, now U.S. Pat. No. 6,030,035 which is a divisional application of U.S. Ser. No. 09/955,897, now fied Oct. 22, 1997 U.S. Pat. No. 5,904,396.

The present invention relates to bicycle saddles and more specifically relates to a cushioned bicycle saddle with an embossed fabric surface and method of manufacturing same.

Most modem high performance bicycle saddles consist of pliable or semi rigid molded shell with a leather, plastic, vinyl or fabric cover fitted thereover. The use of lightweight, durable materials in modem saddles has resulted in a lighter, more durable and more appealing saddle than those earlier designed.

Modem design of bicycle seat covers includes a variety of decorative elements, company logos, and multiple color applications. Such decorative elements are typically comprised of decals or embroidery. Decals on a bicycle saddle which are exposed to repetitive physical contact with the rider tend to fade quickly. Embroidery, on the other hand, which may be more visually appealing and longer lasting than most decals, tends to be costly to apply to the saddle during the manufacturing process, and thus saddles including such embroidery will tend to be more costly to consumers. In addition, embroidery on the seat surface, though sometimes considered a safeguard against slippage from the saddle, may be considered uncomfortable to some riders who prefer a smoother seat.

Conventional bicycle saddles may also include protective elements, such as scuff guards and bumpers, to protect the saddle from abrasion and damage resulting from falls. In addition, light reflectors may be included on a saddle for the protection of the rider. All of these types of protective elements are typically applied by sewing, bolting or gluing these items to the perimeter of the covered shell. Finally, modem saddles now often include internal elements, such as gel inserts or other padding for enhancing rider comfort.

Unfortunately, when all of these desirable elements, i.e. decorative elements, bumper guards and padding, are incorporated into a bicycle seat, the manufacturing process requires a multitude of separate steps, which include, inter alia, sewing of different colored fabric panels together, insertion of padding, the sewing or adhesion of logos and protective elements to underlying fabric, in addition to the conventional stretching of the cover over the shell. Needless to say, the increase in manufacturing steps results in a decrease in affordability for many purchasers.

The present invention provides a padded bicycle saddle having an attractive embossed fabric surface and sturdy, scuff-proof bumper guards, and an economical method of manufacturing same.

SUMMARY OF THE INVENTION

Accordingly, a bicycle saddle is provided and a method of manufacturing same. A method in accordance with the present invention generally comprises the steps of providing a bicycle saddle shell and providing a mold having a molding surface defining, a desired contour for a seat of the bicycle saddle. The shell may comprise a frame structure defining openings therethrough.

The method of the present invention further comprises cutting a fabric, film or the like, to a size and shape suitable for covering at least a top surface of the shell and sealing the fabric to the shell, preferably along a perimeter of the shell.

Next, the shell, having the fabric sealed thereto, is disposed into the mold such that the fabric faces the molding surface. A gelable medium, such as a gel or foam, is injected in fluid form between the shell and the fabric in order force the fabric away from. the shell and into intimate contact with the molding surface.

The contoured seat of the bicycle saddle is molded by allowing the gelable medium to gelate and bond with the fabric while the shell is disposed in the mold. In order to expedite the cooling process and prevent the gelable medium from permeating the fabric, means for cooling the mold may be provided.

Finally, the shell, having the desired contoured seat bonded thereto, is removed from the mold.

In another embodiment of the present invention, the step of providing a mold comprises the step of forming a mold having a molding surface defining a desired pattern to be embossed or imprinted in the bicycle saddle and the step of contouring comprises the step of embossing or imprinting the desired pattern into the fabric by allowing the gelable medium to gelate and bond with the fabric while the shell is disposed in the mold.

For the sake of simplicity, the term "embossing" will hereinafter refer to both embossing and imprinting. In other words, "embossing" is defined herein as a design raised in relief from a surface, or a design impressed in relief from a surface. Thus, as will be described hereinafter, the step of embossing a design in the fabric may result in either a raised design or an impressed design, depending upon the molding surface.

Preferably, the step of sealing the fabric to the shell is comprised of heat sealing the fabric, along a perimeter thereof, to the shell by heat bonding methods or by ultrasonic heat sealing, as known to those skilled in the art. Preferably, conventional adhesives are avoided.

In one embodiment of the invention, the fabric is sized to cover only a top surface of the shell, thus leaving the sides of the shell exposed to function as scuff resistant bumpers.

The present invention may also comprise the step of disposing a resilient material, such as a flexible shoe or a foam pad between the shell and the fabric before the step of sealing the fabric to the shell. When used in conjunction with the openings in the shell, the flexible shoe provides orthotic, hammock-like support to a cyclist seated on the saddle. Furthermore, the orthotic shoe may include a plurality of or a combination of different hardnesses. For example, the shoe may be softest and most resilient along the horn portion of the saddle and of a lower resilience along the seat portion.

The present invention further comprises a bicycle saddle made in accordance with the method briefly outlined above.

BRIEF DESCRIPTION OF THE DRAWINGS

The features and advantages of the present invention will be more clearly understood with reference to the following detailed description, considered with the accompanying Drawings of which.

DETAILED DESCRIPTION

Figure 1:
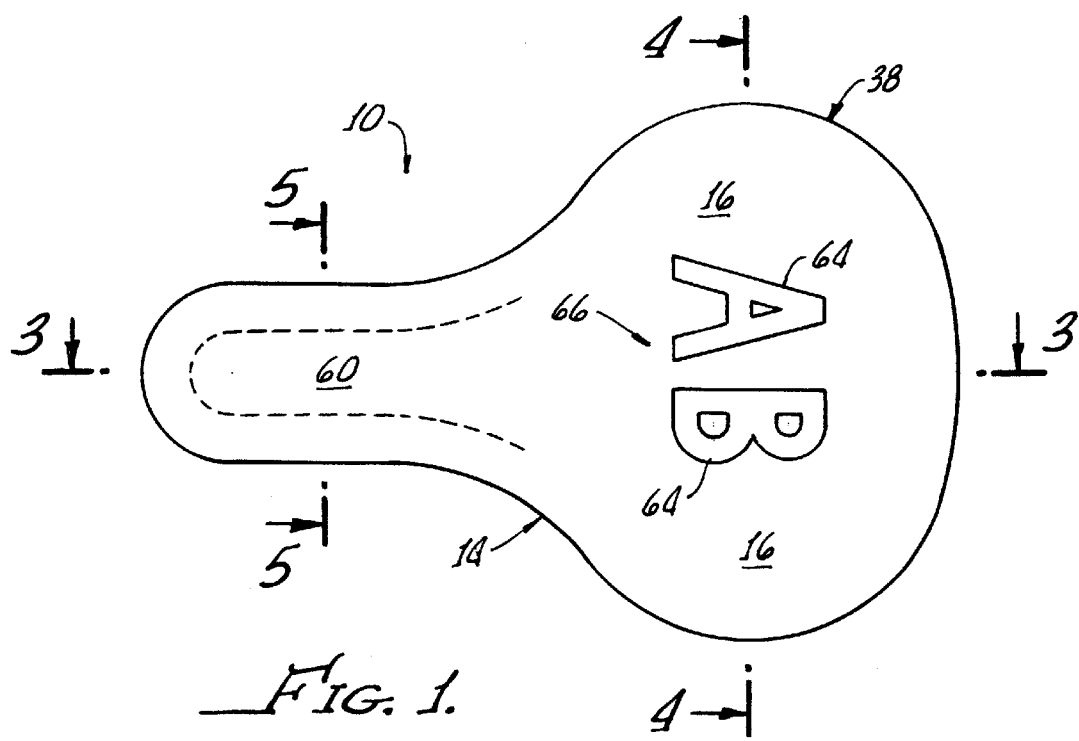
FIG. 1 shows a top plan view of an embodiment of a cushioned bicycle saddle in accordance with the present invention having a contoured, embossed surface.
Figure 2:
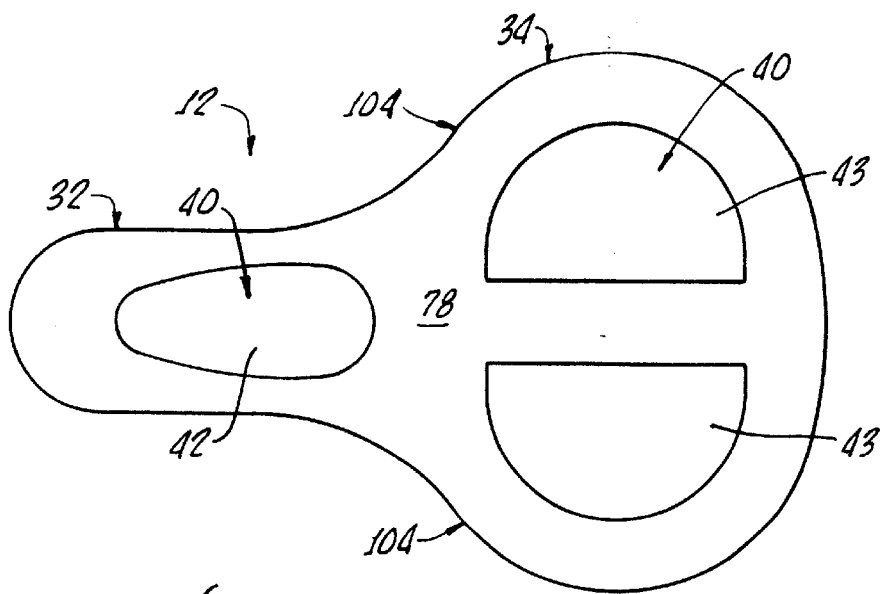
FIG. 2 shows a shell of the bicycle saddle shown in FIG. 1, said shell including openings therethrough.

Turning now to FIG. 1, a bicycle saddle 10 in accordance with the present invention is shown. As shown more clearly in FIGS. 2–5, the bicycle saddle 10 generally includes a bicycle saddle shell 12 made of polypropylene or other durable material, and a cushioned, molded seat surface 14 to be described hereinafter.

Figure 3:
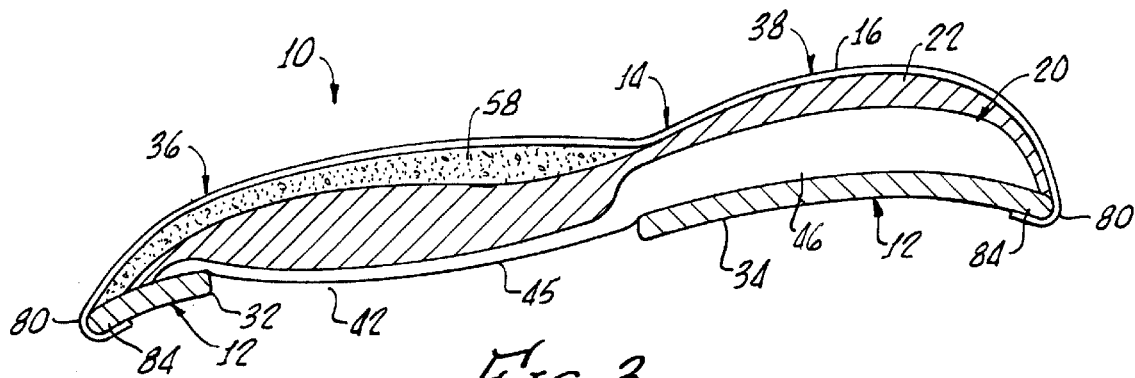
FIG. 3 shows a cross sectional view of the saddle in FIG. 1, taken along line 3—3, showing the contoured saddle surface as having multiple densities.

Referring now to FIG. 3, the molded surface 14 includes a fabric 16, film, or the like, sealed to the shell 12 and preferably provides multiple cushioning densities for enhancing rider comfort It should be appreciated that the cushioning densities may be selected in order to provide a tailored or semi-tailored comfort "fit" in order to meet the needs of a wide range of rider requirements.

More particularly, the saddle 10 may include an orthotic shoe 20 overlying the shell 12, and gel means 22 disposed between the shoe 20 and the fabric 16 for supporting the fabric 16 in a desired contour. As will be discussed hereinafter, the orthotic shoe 20 provides comfortable support, and reduces stresses exerted on a cyclist during riding.

More particularly, the fabric 16 may be comprised of any suitable material. For example, the fabric may comprise, but is not limited to, a four way stretch fabric made of an elastomeric thread such as a segmented polyester-polyurethane, like that sold under the trade name Lycra®, available from I.E. Dupont de Nemours and Company. It may also be a film.

The resilient means 22 may be comprised of a gel or any other suitable soft, easily molded composition. More particularly, the gel means 22 may comprise a thermoplastic compound having a low fluid viscosity at elevated temperatures that can be injection molded and thereafter cooled to produce a rubbery, elastic gel, for example a thermoplastic elastomer. It should be appreciated that the resilient means 22 may alternatively comprise an injectable foam material or the like, however, the terms "resilient means" and "gel means" may be used interchangeably hereinafter.

The flexible shoe 20 is preferably comprised of a compound having a harder durometer measurement than the gel means 22. For example, the shoe 20 may be a molded flexible plastic and even more preferably is comprised of a flexible, resilient thermoplastic gel material having a harder durometer measurement than the softer gel means 22 when cool.

Turning again to FIG. 2, the bicycle saddle shell 12 may comprise a hard, or semi-rigid plastic and generally includes a horn 32 and a seat 34 which correspond to a horn 36 and a seat 38 of the bicycle saddle 10 (see FIG. 1). The saddle 10 preferably includes means, defined by at least one opening 40 in the shell 12, for relieving pressure and enhancing comfort of a cyclist Preferably, the shell 12 may include an opening 42 in the horn 32 and two openings 43 in the seat 34. By cooperating with the flexible shoe 20, the openings 42, 43 provide a hammock like support to a cyclist, the support being determined in part by the size and shape of the openings 42, 43 and the resiliency of the shoe 20 disposed over the openings 42, 43. Thus, for example, in order to provide a saddle 10 having sufficient "give" near the horn 36 to prevent excessive pressure on the prostate of a male cyclist, the shell horn opening 42 may occupy a significant area of the shell horn 32 and the shoe 20 may have maximum resiliency or softness over the horn opening 42.

Thus, it should be appreciated that positioning, number, size and shape of the openings 42, 43, as well as the resiliency of the shoe 20 may vary depending upon type of saddle support desired, and may vary for example, between saddles designed for men and saddles designed for women. Furthermore, it should be appreciated that the shell 12 may alternatively be comprised of a uniform, solid structure having no openings therethrough.

Figure 4:
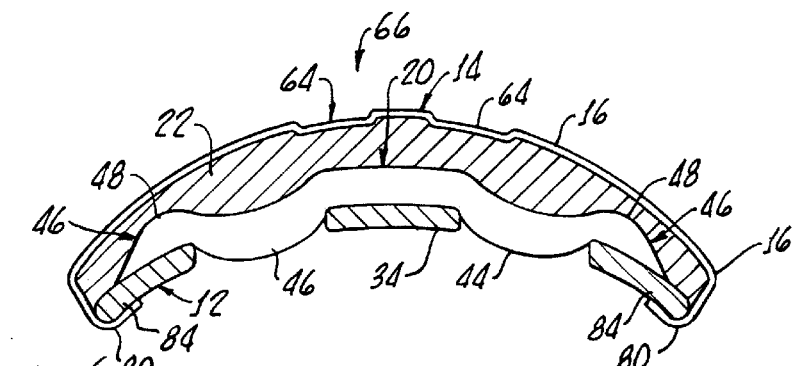
FIG. 4 shows another cross sectional view of the saddle in FIG. 1 taken along line 4—4, showing the embossment in the fabric surface.

As shown in FIG. 4, the flexible orthotic shoe 20 may include a wide portion 44 positioned within each seat opening 43 for facilitating positioning of the shoe onto the shell 12 during saddle assembly.

As discussed hereinabove, the shoe 20 may be custom formed to suit the preferences of a wide range of cyclists. For example, a more resilient shoe 20 may be provided for those preferring minimal support and a less resilient shoe 20 may be provided for those preferring a more firm saddle.

In a similar respect, as shown most clearly in FIG. 3, the shoe 20 may include a more resilient section 45 and at less resilient section 46 for providing different firmnesses within different areas of the saddle 10. In the example shown, the more resilient section 45 is disposed over the horn opening 42 (see FIG.2) and is thin in cross section, thus providing a minimal amount of support at the saddle horn 36. In comparison, the less resilient section 46 is disposed over the seat openings 43, and is relatively thick in cross section, providing greater support at the saddle seat 38.

The shoe 20 may be comprised of any suitably flexible, resilient material and may be manufactured using conventional techniques. Although not shown, the shoe 20 may be comprised of separate members, or may be comprised of a single shoe (such as shown) but made of different materials, such as different gel compositions, providing different firmnesses.

Thus, by providing the shoe 20 with a combination of firmnesses either by using different thicknesses or by using different materials, the horn 36 of the saddle 10 may be made particularly soft in comparison to the seat 38 of the saddle 10.

As shown in lateral cross sectional view of FIG. 4, the shoe 20 may widen outwardly, such that it defines a raised edge 48, or ledges of the shoe 20. The raised edge 48 provides additional support to the saddle 10.

Figure 4A:
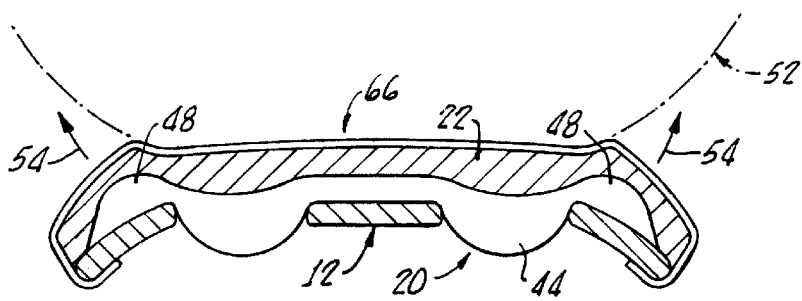
FIG. 4a shows the same cross sectional view of the saddle in FIG. 1 taken across line 4—4, while a cyclist is seated on the saddle, in order to illustrate the hammock-like support provided thereby.

Turning now to FIG. 4a, when a cyclist 52 is seated upon the saddle 10, the shell 12 and orthotic shoe 20 bend to form an elastomeric hammock effect, with the ledges 48 of the shoe 20 rising slightly as shown in a direction represented by arrows 54 and providing support adjacent the ischium bones of the cyclist 52.

Figure 5:
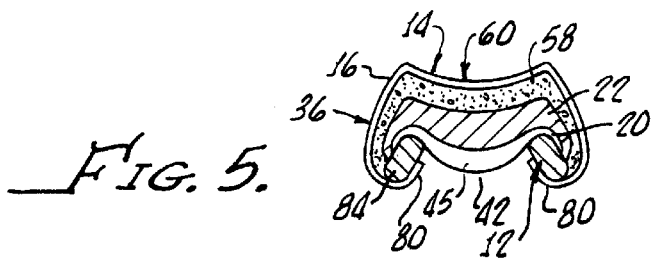
FIG. 5 shows yet another cross sectional view of the saddle in FIG. 1 taken along line 5—5 thereof.

Shown in FIGS. 3 and 5, the bicycle saddle 10 may further comprise at least one foam layer or cushion 58, for example bonded to the fabric 16 and dispesed adjacent the saddle nose 32.

The surface 14 may exhibit a concave contour 60 as means for relieving pressure on, and enhancing comfort to, the cyclist and is preferably provided along the saddle horn 36 as shown in FIG. 1 and FIG. 5. The molded gel means 22 provides means for supporting the fabric 16, with or without a foam layer 58 bonded thereto, in the concave contour 60.

FIGS. 1 and 4 show another feature of the present invention, particularly, lettering, or other graphics 64 on the saddle formed by the gel means 22. More particularly, the gel means may provide means for supporting the fabric 12 in a desired pattern of embossment 66. The gel means 22, as will be discussed hereinafter, may be injection molded between the fabric 16 and the shell 12 such that the surface contour of the saddle 10 defines a logo, lettering, a pattern, or other embossed form.

Turning again briefly to FIG. 4a, when the cyclist 52 is seated on the bicycle saddle 10, the embossment 66 may become substantially compressed, due to fluid like softness of the gel 22. Thus, the cyclist 52 will not perceive embossed irregularities in the seat surface 14. However, the highly resilient nature of the thermoplastic gel will cause the embossed pattern 66 to promptly reappear when the cyclist dismounts the saddle 10.

Figure 6:
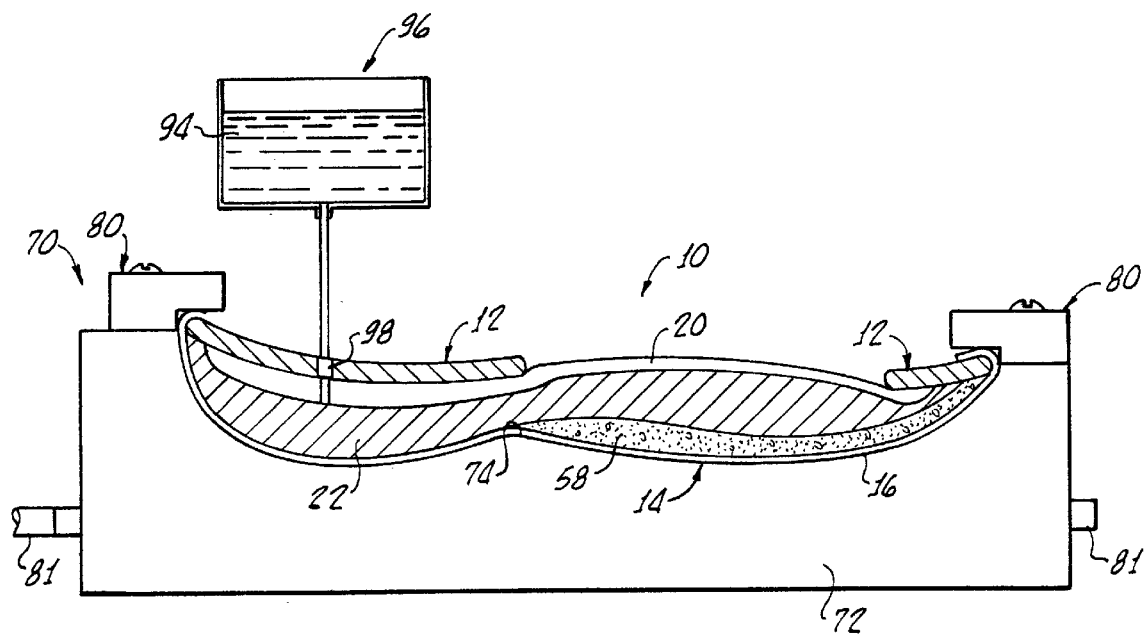
FIG. 6 shows a cross sectional view of apparatus suitable for practicing a method of the present invention for making the saddle shown in FIGS. 1–5.

An example of apparatus 70 suitable for manufacturing the bicycle saddle 10 discussed hereinabove is shown in FIG. 6. A method in accordance with the present invention generally comprises the steps of providing a bicycle saddle shell, such as the shell 12 discussed hereinabove and shown in FIG. 2, and providing a mold 72 having a molding surface 74 defining a desired contour for the cushioned seat 14 of the saddle 10.

A fabric 16 is provided of a size and shape suitable for covering at least a top surface 78 (see FIG. 1) of the shell 12. Referring now to FIGS. 4 and 5, the fabric 16 is sealed to the shell 12, preferably only along a perimeter 80 of the cut fabric 16, leaving the fabric 16 otherwise detached from the shell 12 in order to enable filling with the gel means 22.

For example, the fabric 16 may be cut to be sufficiently large to be tucked and sealed to underside edges 84 of the shell 12 as shown.

Although any suitable means of sealing may be used, the step of sealing the fabric is preferably comprised of heat sealing the fabric 16 to the shell 12. Heat sealing may be accomplished through the use of ultrasonic vibrations applied at levels capable of fusing the fabric with the shell 12. Preferably, the use of adhesives is avoided. This will reduce the risk of noxious chemicals being produced during the manufacturing process.

Heat sealing of the fabric 16 to the shell 12 is preferred because it enables sealing without the need for tacks or staples, and provides a seamless union between the fabric 16 and shell 12. Furthermore, this allows the fabric 16 to be sealed to the shell 12 in a visible location without diminishing the pleasing appearance of the saddle 10.

Prior to the fabric 16 being sealed to the shell 12, a flexible shoe, such as the shoe 20 described hereinabove, may be provided and positioned overlying the shell 12. If openings 42, 43 have been provided in the shell 12, the shoe 20 will preferably be formed as to fit over the shell 12 and freely engage the seat openings 43 as shown in FIG. 4. It should be appreciated that the provision of the shoe 20 is an optional step in a method of the present invention.

Next, the shell 12, having fabric 16 sealed thereto, is disposed into the mold 72 such that the fabric 16 faces the molding surface 74. The shell 12 may be secured to the mold 72 by clamps 80a for example, to maintain proper positioning of the shell 12 during the process. In addition, the molding apparatus 70 may include means, such as a source 81 of recirculating cool water in contact with he mold 72, for cooling the mold 72.

A gelable medium 94, in fluid form, is injected between the fabric 16 and the shell 12 in order to force the fabric 16 away from the shell 12 and into intimate contact with the molding surface 74. The step of injecting the gelable medium 94 includes providing a source 96 of the gelable medium 94, for example a source of hot thermoplastic material as discussed hereinabove, which will form the gel means 22 when cooled. The gelable medium 94 may be injected through a passage 98 provided in the shell 12 and, if applicable by piercing the shoe 20 directly above the passage 98. As discussed hereinabove, it should be appreciated that the gelable medium 94 may be comprised of any other material, such as foam, that is resilient and suitable for molding.

Importantly, the next step comprises contouring the seat 14 of the bicycle saddle 10 by allowing the gelable medium 94 to gelate, for example by allowing the medium 94 to cool and bond with the fabric 16, while the shell is disposed in the mold 72.

The means 81 for cooling the mold 72 will provide for a cleaner molding process by preventing penetration of gelable medium 94 through pores (not shown) of the fabric 16 and will also hasten the molding process. More particularly, by cooling the mold, the hot gelable medium 94 may be applied directly to the fabric, even when the fabric is substantially stretched and permeable, without the need for applying a impermeable layer between the fabric and the hot gel 94. A suitable process for molding the gelable medium directly against a permeable fabric such as Lycra®, is described in detail in U.S. patent application Ser. No. 081652,714 filed May 30, 1996, entitled SEAMLESS GEL CUSHION AND METHOD OF MANUFACTURE, now pending, which is hereby incorporated by reference herein, in its entirety, by this specific reference thereto.

As mentioned above, the bicycle saddle 10 may include the foam cushion 58, preferably bonded by any suitable means, to the fabric 16, prior to the step of sealing the fabric 16 to the shell 12. Upon the contouring step, both the fabric 16 and the foam cushion 58 bonded thereto will become contoured by the gel 22 as shown in FIG. 5.

Finally, the shell 12, having the desired contoured, gel cushioned seat 14 bonded thereto, is removed from the mold 72.

An important feature of the present invention is an optional embossing step, which will enable manufacture of a bicycle saddle including the embossment 66 discussed hereinabove and shown in FIG. 1. More particularly, turning as well to FIG. 6, the step of providing a mold 72 may comprise the step of forming a mold 72 having a molding surface 74 defining lettering 64 or any other a desired pattern to be embossed into the fabric 16 of the bicycle saddle 10. In this embodiment, the step of contouring the seat 14 comprises the step of embossing the desired pattern into the fabric 16 by allowing the gelable medium 22 to gelate and bond with the fabric 16 while the shell 12 is disposed in the mold 72, thus causing the gel means 22 to assume for example, a general contour as well as a detailed embossed pattern 66 (see FIG. 1) defined by the molding surface 74 of the mold 72.

Referring to FIGS. 3 and 5, the method of the present invention may also include the step of sealing a foam, such as the foam cushion 58 described hereinabove, to the fabric 16 before sealing the fabric 16 to the shell 12. Thus, the step of injecting the gelable medium 22 will comprise injecting the gelable medium 94 directly between the foam cushion 58 and the shell 12, or the shoe 20 if applicable.

Figure 7:
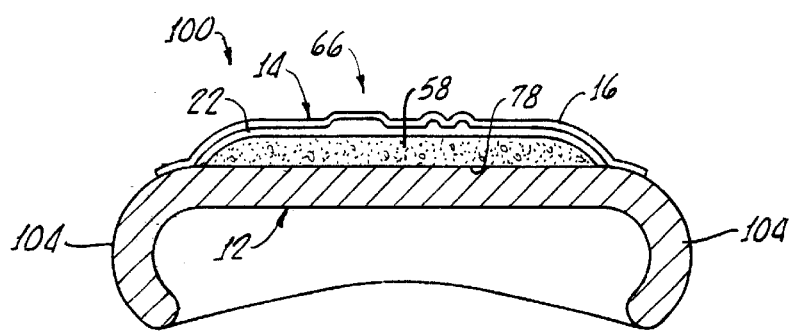
FIG. 7 shows an embodiment of the saddle of the present invention having a cushioned embossed surface and sides of the shell left exposed for providing "scuff-proof" bumpers.

FIG. 7 shows an alternative saddle embodiment 100 of the present invention which may be formed by the method of the present invention. In the Figures, like numerals represent like elements from earlier described embodiments. More particularly, in this embodiment 100, the fabric 16 is sealed only to the top surface 78 of the shell 12, thus leaving the perimeter, or sides 104 of the shell 12 exposed (see also FIG. 2). The exposed sides 104 of the shell 12 may function as a scuff resistant bumper. Thus, in this embodiment 100 the fabric 16 will be disposed only on the seat 14 of the saddle 10, such that it covers the cushioning elements. By covering only the cushioning elements of the saddle 100, there is less likelihood of fabric abrasions or tears upon a fall of the bicycle (not shown) to which the saddle is attached Additionally, in order to illustrate several other potential variations of the present invention, in the embodiment 100 shown, the foam pad 58 is sealed directly to the shell 12, no orthopedic shoe is provided, and the gel means 22 forms raised, rather than imprinted embossment 66 in the fabric 16.

Although there has been hereinabove described a cushioned bicycle saddle and a method of manufacturing same, in accordance with the present invention, for purposes of illustrating the manner in which the invention may be used to advantage, it will be appreciated that the invention is not limited thereto. Accordingly, any and all modifications, variations, or equivalent arrangements which may occur to those skilled in the art should be considered to be within the scope of the present invention as defined in the appended claims.

What is claimed is:

1. A method of making a bicycle saddle, said method comprising the steps of:

providing a bicycle saddle shell;

providing a fabric of a size and shape suitable for covering at least a top surface of the shell;

providing a mold having a molding surface defining a desired contour for a seat of the bicycle saddle;

sealing the fabric to the shell;

disposing the shell having the fabric sealed thereto, in the mold such that the fabric faces the molding surface;

injecting a gelable medium between the bicycle saddle shell and the fabric in order to force the fabric away from the shell and into intimate contact with the molding surface;

contouring the seat of the bicycle saddle by allowing the gelable medium to gelate and bond with the fabric while the shell is disposed in the mold; and removing the shell having the desired contoured seat bonded thereto from the mold.

2. The method according to claim 1 wherein the step of contouring the seat of the bicycle saddle includes cooling the mold to prevent penetration of the gelable medium through the fabric.

3. The method according to claim 1 wherein the step of sealing comprises the step of sealing the fabric to the shell along a perimeter of the fabric.

4. The method according to claim 1 wherein the step of providing a fabric comprises cutting the fabric to a size and shape suitable for covering only a top surface of the shell, and the step of sealing includes sealing the fabric to the top surface of the shell and leaving sides of the shell exposed.

5. The method according to claim 1 wherein the step of providing a mold comprises the step of providing a mold having a molding surface defining a desired pattern to be embossed into the bicycle saddle and the step of contouring comprises the step of embossing the desired pattern into the fabric by allowing the gelable medium to gelate and bond with the fabric while the shell is disposed in the mold.

6. A method of making a bicycle saddle, said method comprising the steps of:

providing a bicycle saddle shell having a horn and a seat with an opening in the horn and an opening in the seat;

providing a fabric of a size and shape suitable for covering at least a top surface of the shell;

inserting a flexible shoe between the shell and the fabric, said flexible shoe including a more resilient section disposed over the horn opening and a less resilient section disposed over the seat opening;

providing a mold having a molding surface defining a desired contour for a seat of the bicycle saddle;

sealing the fabric to the shell;

disposing the shell having the fabric sealed thereto, in the mold such that the fabric faces the molding surface;

injecting a gelable medium under the fabric in order to force the fabric away from the shell and into intimate contact with the molding surface;

contouring the seat of the bicycle saddle by allowing the gelable medium to gelate and bond with the fabric while the shell is disposed in the mold; and removing the shell having the desired contoured seat bonded thereto from the mold.

7. The method according to claim 6 wherein the step of contouring the seat of the bicycle saddle includes cooling the mold to prevent penetration of the gelable medium through the fabric.

8. The method according to claim 6 wherein the step of sealing comprises the step of sealing the fabric to the shell along a perimeter of the fabric.

9. The method according to claim 6 wherein the step of providing a mold comprises the step of providing a mold having a molding surface defining a desired pattern to be embossed into the bicycle saddle and the step of contouring comprises the step of embossing the desired pattern into the fabric by allowing the gelable medium to gelate and bond with the fabric while the shell is disposed in the mold.

* * * * *